Oct. 28, 1958 J. L. JEANNERET 2,857,796
GAUGE SYSTEM FOR MACHINE TOOLS
Filed Aug. 16, 1954 9 Sheets-Sheet 1
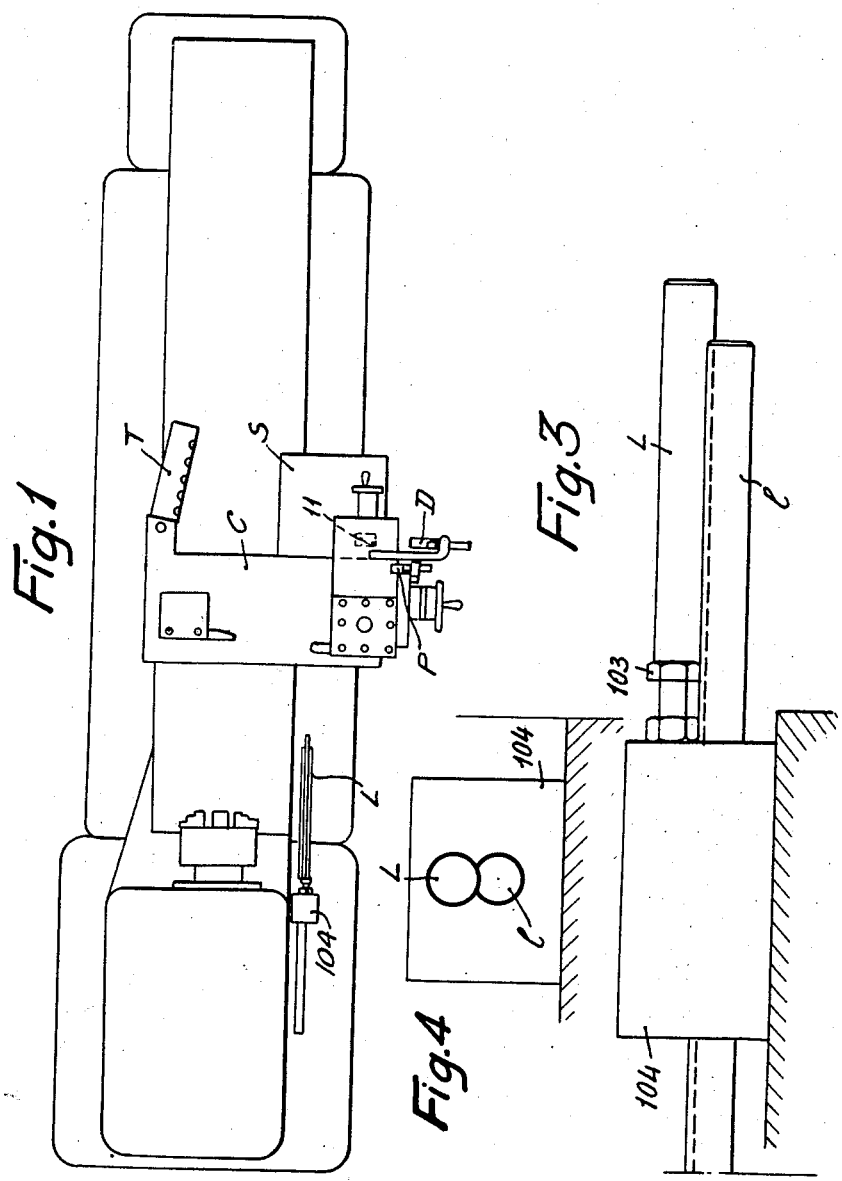
INVENTOR
JULES LOUIS JEANNERET
By Young Energy Thompson
ATTYS.

Oct. 28, 1958  J. L. JEANNERET  2,857,796
GAUGE SYSTEM FOR MACHINE TOOLS
Filed Aug. 16, 1954  9 Sheets-Sheet 2
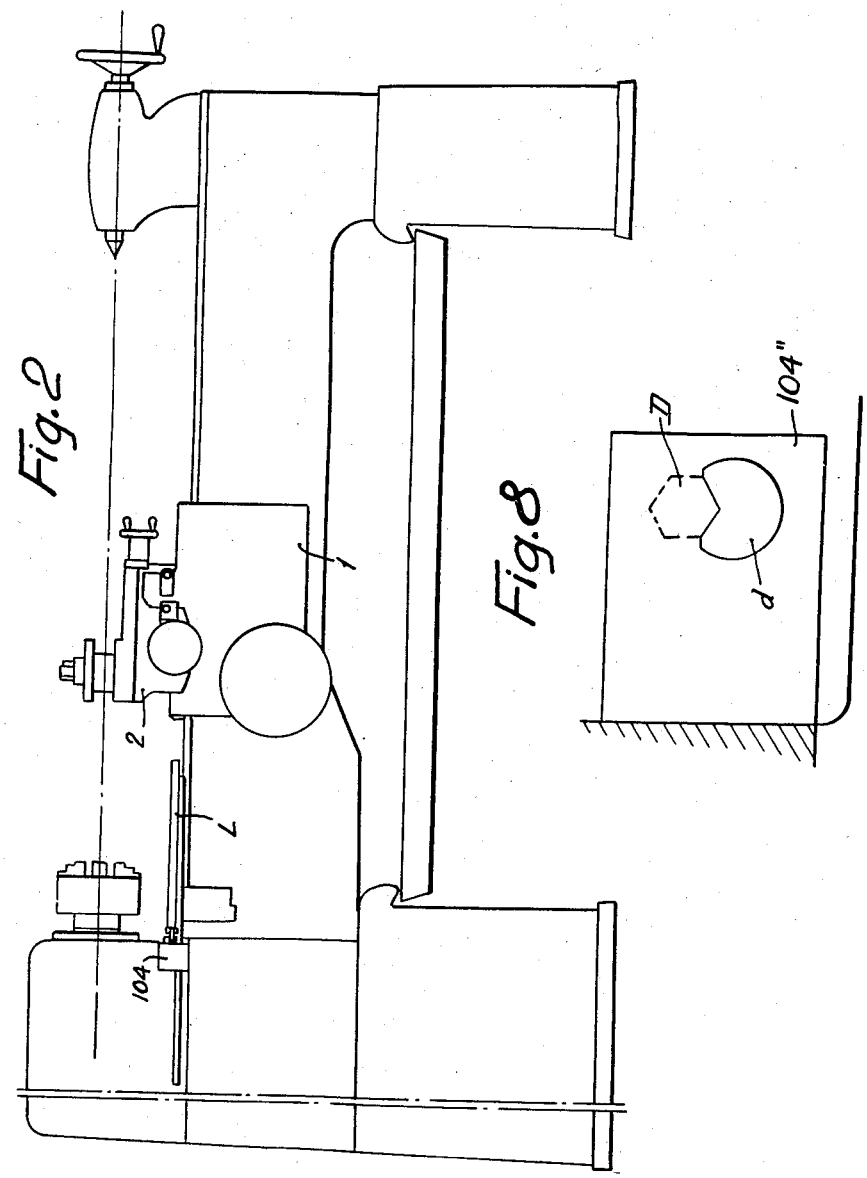
INVENTOR
JULES LOUIS JEANNERET
By Young, Emery & Thompson
ATTYS Oct. 28, 1958  J. L. JEANNERET  2,857,796
GAUGE SYSTEM FOR MACHINE TOOLS
Filed Aug. 16, 1954  9 Sheets-Sheet 3
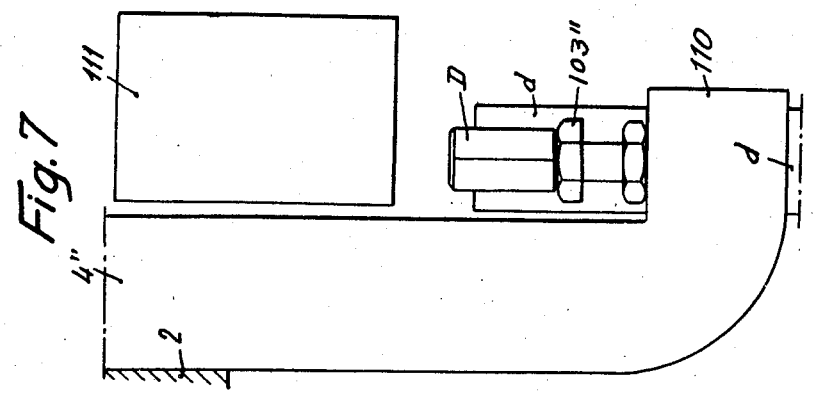
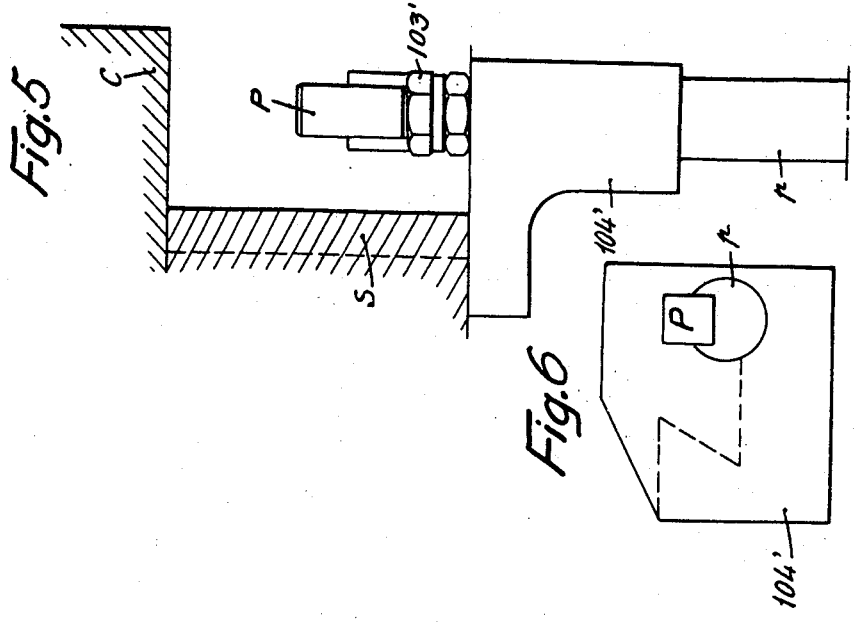
INVENTOR
JULES LOUIS JEANNERET
By Young, Emery + Thompson
ATTYS Oct. 28, 1958   J. L. JEANNERET   2,857,796
GAUGE SYSTEM FOR MACHINE TOOLS
Filed Aug. 16, 1954   9 Sheets-Sheet 4

INVENTOR
JULES LOUIS JEANNERET
By Young, Emery & Thompson
ATTYS

Oct. 28, 1958
J. L. JEANNERET
2,857,796
GAUGE SYSTEM FOR MACHINE TOOLS
Filed Aug. 16, 1954
9 Sheets-Sheet 5
Fig.11
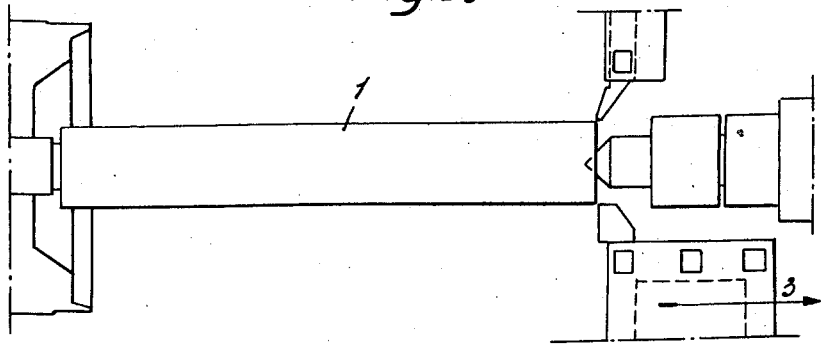
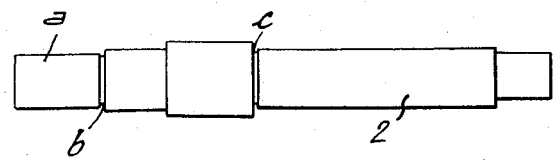
INVENTOR
JULES LOUIS JEANNERET
By Young, Emery & Thompson
ATTYS Oct. 28, 1958     J. L. JEANNERET     2,857,796
GAUGE SYSTEM FOR MACHINE TOOLS
Filed Aug. 16, 1954     9 Sheets-Sheet 6
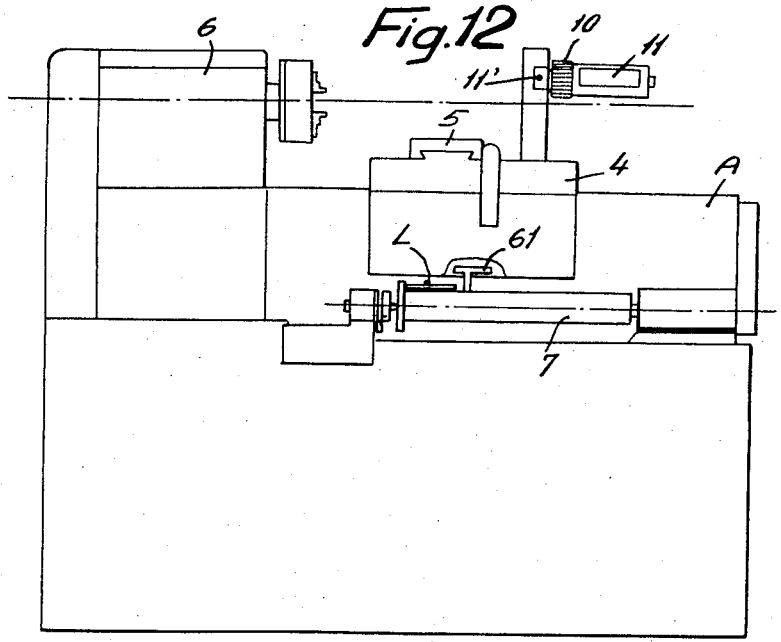
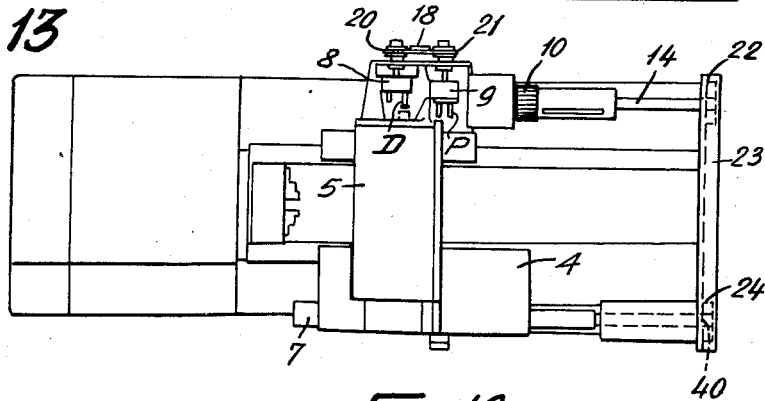
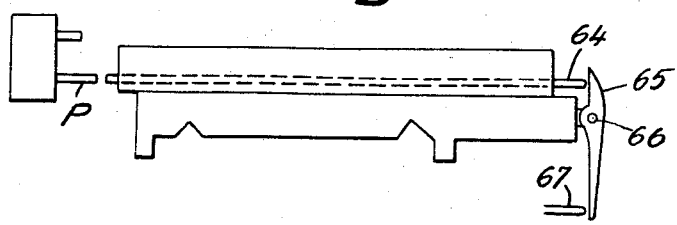
INVENTOR
JULES LOUIS JEANNERET
By Young, Emery & Thompson
ATTYS Oct. 28, 1958　　　J. L. JEANNERET　　　2,857,796
GAUGE SYSTEM FOR MACHINE TOOLS
Filed Aug. 16, 1954　　　9 Sheets-Sheet 7
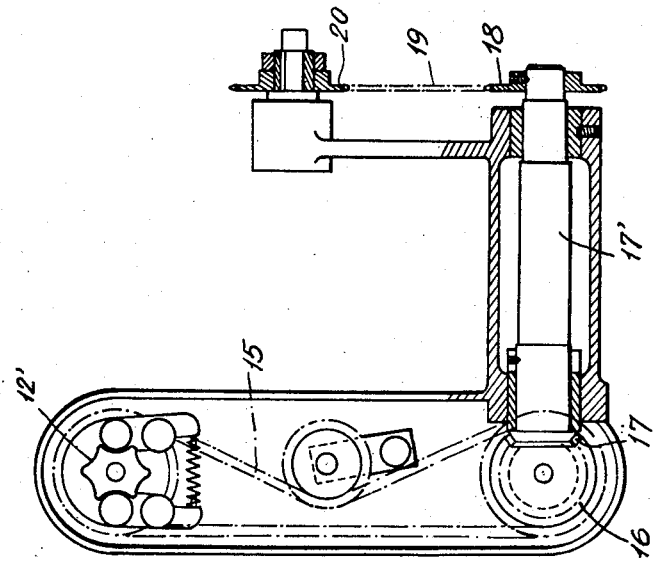
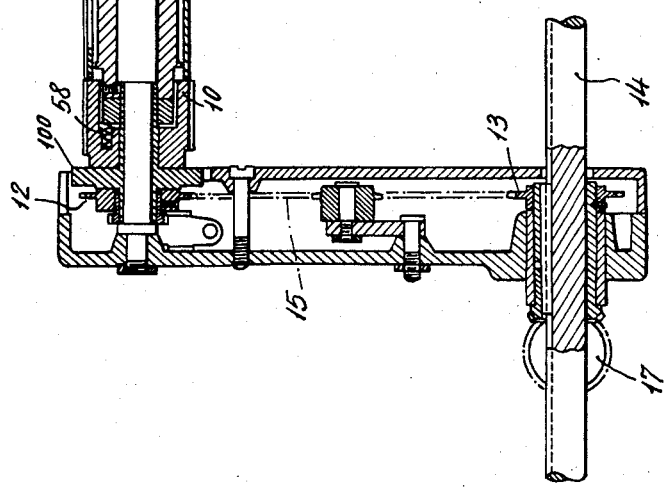
INVENTOR
JULES LOUIS JEANNERET
By Young, Emery & Thompson
ATTYS Oct. 28, 1958   J. L. JEANNERET   2,857,796
GAUGE SYSTEM FOR MACHINE TOOLS
Filed Aug. 16, 1954   9 Sheets-Sheet 8

INVENTOR
JULES LOUIS JEANNERET
By Young, Emery & Thompson
ATTYS.

Oct. 28, 1958
J. L. JEANNERET
2,857,796
GAUGE SYSTEM FOR MACHINE TOOLS
Filed Aug. 16, 1954
9 Sheets-Sheet 9
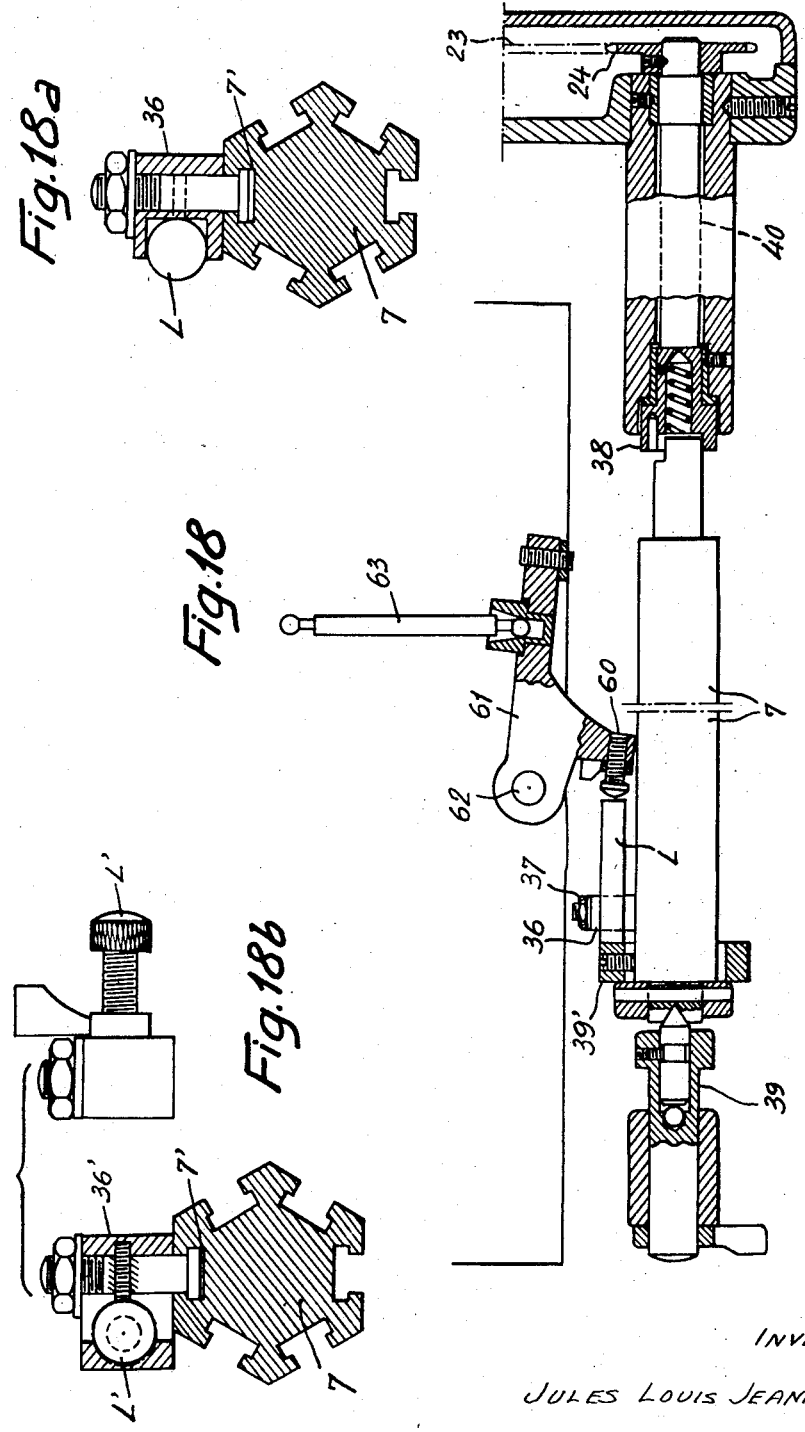
INVENTOR
JULES LOUIS JEANNERET
By Young, Emery & Thompson
ATTYS

United States Patent Office 2,857,796
Patented Oct. 28, 1958

2,857,796
GAUGE SYSTEM FOR MACHINE TOOLS

Jules Louis Jeanneret, Paris, France

Application August 16, 1954, Serial No. 450,203

Claims priority, application France August 4, 1952

1 Claim. (Cl. 82—21)

My invention is in part a continuation of my copending specification Ser. 367,936 now abandoned. A primary object of my invention consists in providing machine tools with gauges defining the lengths and depths of the cuts executed by its different tools in a very simple manner, said gauges being constituted by mere cylindrical or, more generally speaking, prismatic members engaged selectively in correspondingly shaped recesses formed on one of the parts of the machine that moves with reference to another part, said recesses extending in parallelism with the direction of movement of said parts so that the gauges abut against a stop carried by the said other part at the end of a relative travel between the parts considered, which travel is defined by the length of the selected gauge.

According to a further object of my invention, the abutment of a gauge against the cooperating stop produces the mechanical disconnection of a clutch controlling the relative movement of the parts considered or of a clutch controlling all the movements of the machine tool.

According to a still further object of my invention, the different gauges which are to be used in succession for the different cuts to be executed in a given direction by a same tool are carried in similar parallel recesses formed in a support such as a rotary barrel or turret and furthermore, means are provided whereby the operator is allowed to control simultaneously the different gauge supports so as to set the latter simultaneously at the end of any cut into the positions for which those gauges carried by said different supports are brought into alignment with the stops, which correspond to a given machining.

According to yet another object of my invention, the different operative steps to be executed in the machining of a piece of work, are illustrated in the successive lines of a chart and the latter is fitted over a drum which is controlled in unison with the different gauge-carrying barrels in a manner such that, upon rotation of the barrels, the line corresponding to the machining step to be executed, and only that line, appears to the view of the operator through a stationary slot extending longitudinally over the chart-carrying drum.

Further and advantageous features of my invention will appear in the reading of the following disclosure, given by way of example, of a number of embodiments of my invention.

These embodiments are illustrated together with diagramatic illustrations in the accompanying drawings, wherein:

Fig. 1 is a diagrammatic view of a lathe as seen from above;

Fig. 2 is a diagrammatic elevational view thereof;

Figs. 3 and 4 are respectively elevational and sectional views on a larger scale of the gauge carrier cooperating with the longitudinal carriage;

Figs. 5 and 6 are respectively a plan view and a cross-sectional view of the gauge-carrying groove cooperating with the rear tool on the transverse carriage;

Figs. 7 and 8 are similar views of the gauge carrier cooperating with the forward tool on said transverse carriage;

Fig. 11 shows the above-mentioned turning chart while Figs. 12 and 13 illustrate in side and plan views a lathe provided with a turret device adapted to produce the simultaneous change of gauge for the different movements of the latter.

Figs. 14 and 15 illustrate the control for the different gauge-carrying turrets.

Fig. 18 shows a portion of the turret carrying the gauges limiting the travel of the saddles.

Figs. 18a and 18b illustrate in transverse sections two modifications in the mounting of the gauges on this latter turret.

Lastly, Fig. 19 is a diagrammatic illustration of the means stopping the movement of the transverse carriage through a gauge-engaged stop at the end of the travel allowed for the rear tool.

The lathe illustrated diagrammatically in Figs. 1 and 2 is of a conventional type which it is unnecessary to describe and it is sufficient to mention the longitudinal carriage or saddle S and the transverse carriage C.

Figure 10:
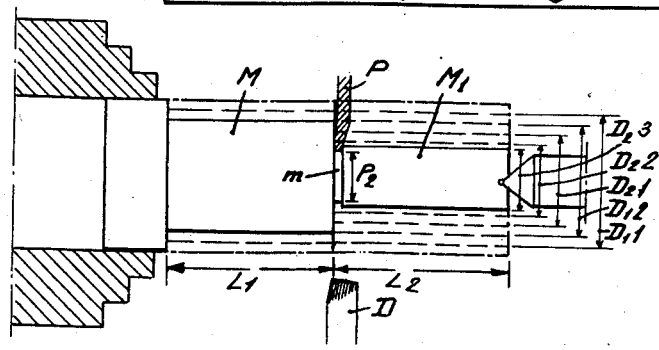
Fig. 10 is a diagrammatic showing of the cuts executed in accordance with my invention on the lathe.

Supposing, by way of example, that it is desired to machine a piece of work assuming the shape illustrated in Fig. 10, i. e. a piece of work turned to different diameters M, M–1 with a narrow section of reduced diameter at $m$, I resort to two tools, to wit a forward tool D adapted to machine the cylindrical surfaces the diameters of which are M and M–1, and a rear tool P for truing the radial surfaces and for cutting the narrow depressed section $m$. Thus, in the case illustrated, there are three movements to be controlled, which are respectively the movement of the longitudinal carriage and the two movements of the transverse carriage which are adapted to produce the desired depths of cut to be executed respectively by the forward tool D and by the rear tool P.

The successive machining steps are operated in the conventional manner as follows: first, a movement of the longitudinal carriage until it abuts against the stop constituted by the gauge L–1 defining the longitudinal extent L–1 of the radial cuts executed by the forward tool D, which latter is stopped at each stage through abutment of the transverse carriage against successive gauges D–1–1, D–1–2, defining the corresponding cuts of the forward tool; the longitudinal section M being thus cut over the length L–1 or preferably over the length L–1+L–2 to the desired depth, I proceed with the following cuts corresponding to the depths of operation D–2–1, D–2–2, D–2–3, and defined by gauges having similar references, said cuts being executed over a length corresponding to a longitudinal displacement of the longitudinal carriage defined by a gauge L–2 and illustrated at L–2 in Fig. 10. Lastly, I proceed with the truing of the transverse surface between the sections M and M–1 and wth the machining of the narrow section $m$ by means of a rear tool P cooperating similarly with a stop constituted by a gauge P–2 defining the diameter P–2 of the section $m$.

I will now describe the arrangement of the gauges forming the stops and of the grooves or slideways carrying them, said gauges and grooves corresponding to the three above-mentioned movements executed by the longitudinal carriage and by the two tools on the transverse carriage respectively. As concerns the longitudinal carriage, the stop is constituted by a gauge L (Figs. 3 and 4) fitted inside a slideway *l* mounted in a shoe 104 rigid with the stationary body of the lathe, the slideway being longitudinally adjustable in the said body. The first gauge L–1 of the series of gauges L, which corresponds to the first travel to be considered, is held fast by means of an adjusting nut 103 adapted to define the location of the successive gauges L inside the groove or slideway *l*. The cross-section of Fig. 4 shows that in this case, the cross-section of the gauge is circular and, at the same time, the grooved part or slideway assumes a solid cylindrical shape provided in its upper portion with a recess defined by an arcuate concave surface matching the lower surface of the gauge L. These gauges L, as well as the slideways carrying them, may receive a distinctive color, say black, and the operator cannot, consequently, ever make a mistake in the selection of the gauges since he is always aware that he must use a gauge L which is black and cylindrical, with a likewise black and cylindrical slideway. The adjustment having been executed for the first gauge L–1, it is sufficient, when cutting with the forward tool D, to replace the gauge L–1 by the following gauge L–2 with a view to cutting the diameter M–1 of the following section. Obviously, the number of gauges L of the series of gauges L–1 should correspond to the number of sections of the piece of work that are to be turned to different diameters.

Figs. 5 and 6 illustrate in a similar manner the stop system provided for the transverse carriage when operating with the rear tool P. In this case again, the gauge P is fitted inside the slideway or groove *p* adjustably secured to the shoe 104' mounted on the longitudinal carriage S. The adjustment is performed in the same manner as in the case of the gauges L and a series of gauges P provides for the execution of cuts the depths of which are selected according to the conditions of operation and are defined by the gauge P that is being used. In the example illustrated, the gauges P assume a square shape in cross-sectional view and are colored green. The slideway or groove *p* which is also green, is consequently provided in its upper surface with a recess adapted to match the shape of the square gauges P.

Lastly, Figs. 7 and 8 illustrate a structure of the same type as that described with reference to the preceding figures and showing a gauge D carried by a slideway or groove *d*, the gauge D being hexagonal and colored red, the slideway being also red and being defined at its upper surface by a re-entrant dihedral adapted to match two successive sides of a hexagonal gauge D. A plurality of series of gauges D are provided, each series corresponding to a different unitary depth of cut.

It will be remarked that all the slideways are within reach of the operator and that the tightening of the adjusting nuts such as 103, 3', 3" does not produce any substantial bending of the shoes or the like supports 104, 104', 104", even in the case of the stops D for which the shoe 104" carries the gauge on a short folded inturned section 110, said shoe 104" being secured to the body of the transverse carriage C so as to abut through its gauge D against the longitudinal carriage S. The actual abutment rigid with said longitudinal carriage is illustrated in Fig. 7 at 111 and is adapted to be engaged by the gauge D.

It is thus apparent that the operator may use a series of say six black round gauges forming abutments for the longitudinal movement, a series of six green square gauges for cooperation with the rear tool P on the transverse carriage and a plurality of series of red hexagonal stops for the execution of the successive cuts executed by the forward tool D on the transverse carriage, each of last mentioned series corresponding to different conditions of operation.

Figure 9:
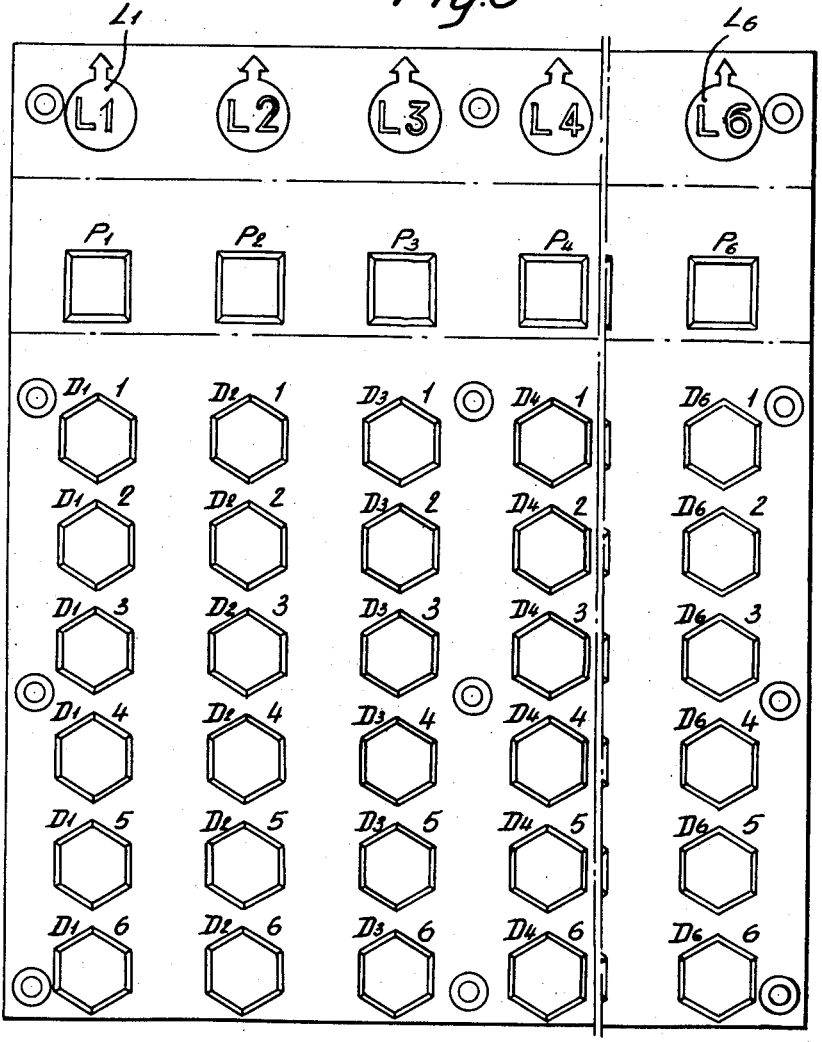
Fig. 9 is a view of a pigeon-holed board or casing carrying the gauges before use.

According to a further feature of my invention, the different gauges L, P and D are carried by a board or casing T rigid with the longitudinal carriage e. g., said board being subdivided in a manner such that the gauges may be selected by the operator without the latter moving away from the point where he is normally standing. I have illustrated by way of example in Fig. 9 an embodiment of such a board including a line of round recesses housing the six gauges L–1 . . . L–6 that are to define six different lengths of stroke to be executed by the longitudinal carriage and underneath said row is provided a series of six square recesses P–1 . . . P–6 for housing the gauges defining the length of stroke of the rear tool and lastly, six rows of hexagonal recesses adapted to house respectively six series of six hexagonal gauges defining the strokes of the forward tool, said gauges being designated by the references D–1–1 . . . D–1–6, D–2–1 . . . D–2–6 . . . D–6–6. These gauges may be laid horizontally or vertically according to the manner of securing the board to the machine-tool. The gauges such as L–1, P–1, D–1 . . . D–1–6 are laid in a same vertical column corresponding to a predetermined section to be turned to a given diameter on a piece of work. It is of advantage to give the areas of the board corresponding to the different gauges, colors that are identical with those of the corresponding gauges.

I will now describe the improved arrangement wherein the gauges, instead of being fitted in a support rigid with one of the parts executing a relative movement with reference to another part of the machine tool, are carried by a shiftable member, preferably a rotary turret, so as to be automatically shifted after each cut and thus bring the gauge corresponding to the next cutting step into its operative position.

As a matter of fact, in the case illustrated in Figs. 1 to 10, there was provided for each kind of longitudinal or transverse movement, one or several series of gauges of different lengths which were introduced into corresponding recesses, the lengths of the different gauges of a given series adapted for use for a predetermined type of cut corresponding to the depths or lengths of the said cuts. This requires, prior to each operative step in the machining of each piece of work, a manual selection of the gauges for the following stage.

Now, the positioning of the gauges on a support shiftably mounted on one of the parts of the lathe in relative movement with reference to another part, allows executing the preliminary selection of such gauges with a view to furthering the automatic machining of a large number of similar pieces of work through a succession of well defined steps; the automatic positioning of the different gauges required for executing the said steps is provided by the shifting of a gauge-carrying support fitted once and for all with the desired gauges for the machining of the above-mentioned large number of pieces of work. Thus, each turret or support is adapted to receive before operation the different gauges adapted to define the length of a predetermined movement of the tool such as a longitudinal feed, and a transverse feed of the front tool, a transverse feed of the rear tool for the different successive cuts to be executed on each piece of work in a mass production, while means are provided for driving the said turrets or the like supports in synchronism and bringing them, for each successive cut to be executed on any piece of work, into a position such that the gauges defining the movements corresponding to the said cut, may lie in register with the parts of the machine tool which they are to stop.

I will assume hereinafter, for sake of clarity, that the machine tool to be considered is a lathe including a front tool executing a series of cuts of predetermined lengths on the work to be machined, while a rear tool serves for executing more or less deep surfacing cuts on transverse surfaces of the piece of work between predetermined machined sections of the latter; in such a case, the gauges limit the length of cut and the depth of cut for the front tool and the depth of cut for the rear tool. But obviously the invention has a more general scope and may be applied to machine tools of widely different types.

Similarly, it is assumed in the example given hereinafter that six different gauges are used as a maximum for each of the different movements to be considered, so that it is sufficient to resort to turrets each adapted to carry six gauges distributed uniformly round its axis, the substitution of one gauge for another being performed through a simultaneous rotation by 60° of the different turrets. However, the number of gauges per turret may be selected as desired and may be superior or inferior to six.

The example referred to and illustrated in Figs. 12 and 13 is that of a lathe including a longitudinal carriage 4 and a transverse carrier 5 the headstock of which is illustrated at 6; the gauge L defining the length of stroke of the saddle or longitudinal carriage is mounted on a carrier member 7 rigid with the frame A while the gauges D and P stop the longitudinal movement of the transverse carriage 5 so as to define respectively the location of the front tool before the cutting corresponding to the desired work of said tool and before the surfacing cut to be executed by the rear tool.

In the turning chart shown in Fig. 11, 1 designates an illustration of the piece of work to be machined and 2 an illustration of the same piece when machined. The lines carrying the large digits 1 to 6 show in their successive compartments corresponding to the columns "A," "B," "C," "D," "E," "F," respectively the following data: the location of the front tool and of the rear tool P with reference to the work 1 and to the abutment 3 at the beginning of the cut, the state of engagement or disengagement of the saddle or longitudinal carriage with reference to its driving means, the location of the front tool D at the end of the cut, the state of engagement or disengagement of the transverse carriage which serves for surfacing purposes, with reference to its driving means, the location of the rear tool P at the end of its cut, and lastly at "F" the data concerning the operations to be executed before beginning the following cut. In the example illustrated, the cut No. 1 consists in executing the machining of the left hand side of the finished member, which, as mentioned hereinafter, is to be turned during operation so as to face a direction opposed to its original position; this first cut is executed after a suitable adjustment. In other words and with a view to defining the length of the cut to be executed by the front tool, I resort to a gauge L1 the length of which corresponds to the length of cut with the usual allowance. Similarly, the gauge corresponding to the transverse movement of the front tool should assume a length D1 equal to the depth of cut plus the usual alllowance while the rear tool P is held in its inoperative position by a gauge P1 of suitable length.

For this first cut, the column "B" of the chart shows that the saddle is to be engaged so as to provide for the longitudinal movement of the front tool D, while the blank in the column "D" relating to the engagement of the surfacing tool, shows that the transverse carriage is not clutched in since there is no surfacing to be executed.

At the end of the first cut, the saddle is urged rearwardly by 3 mm. and, as shown in line No. 2, the following bearing surface is machined, said bearing corresponding in the example illustrated to the maximum diameter of the finished piece of work. This is provided by a rocking movement of the support or turret 7 so as to substitute for the gauge L1 the next longitudinal gauge L2 corresponding to the length to be given to the cut to be executed by the tool D. At the same time, the gauge provided for the rear tool is replaced, through a pivotal movement of the support or turret 9, by another gauge of the same length corresponding also to the inoperative position of the tool and, lastly, the gauge for the front tool is replaced through a pivotal movement of the support or turret 8 by a further gauge of a lesser predetermined length. This difference in length between the successive gauges D1 and D2 for the front tool is equal to the difference between the radii of the parts to be obtained through two successive cutting steps.

The third cut executed after the saddle has returned into engagement with the abutment 3, on the tail-stock is intended for the machining of the extreme section $a$ of the piece of work and, to this end, the next longitudinal gauge L3 has a length corresponding to the length of said section while the corresponding front tool gauge D3 has a length corresponding to the minimum diameter to be obtained during said third cut, and the rear tool gauge has a length corresponding to the operation to be executed at the end of the cut so as to produce the transverse cut at $b$.

The third cut being thus executed, the piece of work is turned end for end so as to provide for the machining of its opposite end and the chart shows clearly in this case how the cuts No. 4 and No. 5 are to be executed. In the case of the cuts No. 3 and No. 4, the engagement of the transverse carriage with its control means is illustrated as necessary so as to ensure the execution of the two transverse cuts $b$ and $c$. It is easy to establish in accordance with the above data, the list of the successive gauges to be used in the different turrets for the successive cuts.

It is thus apparent that such lists may be carried on the turning chart so as to allow selecting the successive gauges which are to provide a limitation of the lengths of the cuts executed by the front tool D by the corresponding longitudinal gauges and a limitation of the depth of said cuts through the agency of the gauges D while the gauges P define the shifting of the transverse carriage as required for executing the transverse cuts by means of the rear tool P.

I will now describe the arrangement serving in accordance with my invention for the automatic substitution of the different gauges of each series which are to be used for the different successive cuts.

In the arrangement illustrated diagrammatically in Figs. 12 and 13, the gauges of the three series defined hereinabove are carried respectively by three-gauge-carrying turrets 7, 8, 9 which are controlled simultaneously so as to bring simultaneously into their operative positions the different gauges as required for executing the different cuts defined in the above-described turning chart.

The common control system for said turrets is carried by the saddle and includes, as shown in Figs. 12 and 13, a knurled knob 10 within reach of the operator; a rotation of said knob through 60° in the case illustrated, defines, before each cut and through the agency of an adjustable stress-limiting device (Fig. 14) adapted to cut out the possibility of twisting of the gauges in the case of a mistake in operation, the simultaneous rotation of the three turrets 7, 8 and 9. A cylinder 56 (Fig. 14) rigid with the knurled knob carries the turning chart shown in Fig. 11 so as to allow the successive lines of the latter to appear selectively in the longitudinal slot 11 formed in the stationary cover 57 capping the cylinder 56; thus the number given to each cut and the operative data may be read by the operator, which member and data correspond to the gauges which are brought in succession into their operative position at any moment under the action of the rotation of the turrets controlled by the knob 10.

The transmission controlled by the milled knob 10 is illustrated with further detail in Figs. 14 and 15. The drum 100 driven by said knob is rigid with a chain-engaged pinion 12, which is also rigid with a hexagonal member 12' defining exactly, in association with elastic means, the six different equally distributed operative positions which the knurled knob may assume round its axis.

The pinion 12 drives through the agency of the corresponding chain 15 a second pinion 13 rigid with the shaft 14 driving in its turn through the bevel gears 16 and 17, the transverse shaft 17'. The latter drives the chain pinion 18 driving in its turn simultaneously through the chain 19 the chain pinion 20 controlling the turret 8 carrying the gauges corresponding to the front tool D and the pinion 21 controlling the turret 9 carrying the rear tool gauges. On the other hand, the main shaft 14 carries the chain pinion 22 which drives in its turn through the agency of the chain 23 and of the wheel 24 the turret 7 carrying the gauges defining the length of cut.

Figure 17:
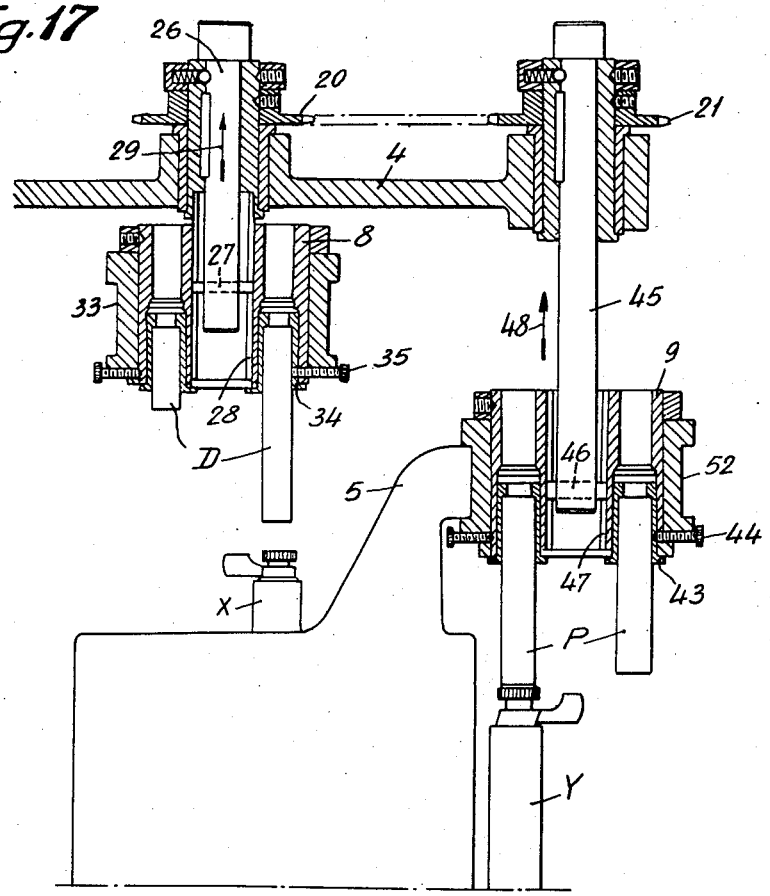
Figs. 16 and 17 are a side view and a view from above of the arrangement including the two gauge-carrying turrets corresponding to the transverse movements of the two front and rear tools.
Figure 16:
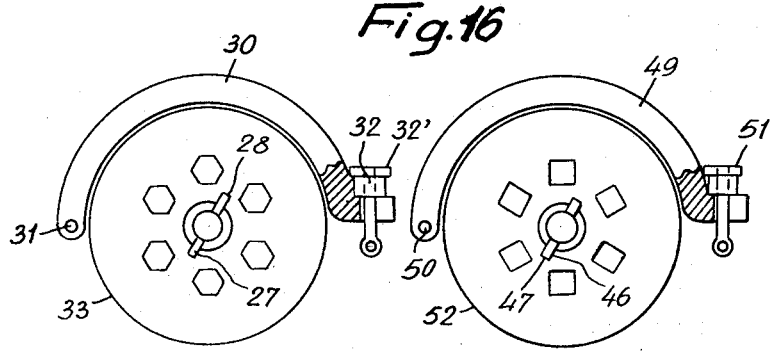

I will now describe with further detail, reference being made to Figs. 16 and 17, the turrets 8 and 9 carrying the gauges defining the transverse movements of the front and rear tools. The turret 8 carries through the agency of sockets 34, which are uniformly distributed round its axis, different gauges defining the transverse movement of the front tool, said gauges being held fast by radial screws 35. The chain pinion 20 controlling the turret 8 drives the latter through the agency of the shaft 26 and of a radial key 27 the ends of which slide inside longitudinal grooves 28 provided in the surface of the axial bore formed in the turret 8, said turret 8 being revolubly held in a member 33 fitted inside the saddle 4. The gauges carried by the turret 8 are adapted to engage, at the end of the transverse stroke of the transverse carriage, a stationary stop rigid with the transverse carriage 5 as shown at X. It is apparent that the positioning of the gauges D inside the turret 8 is an easy matter since it is sufficient to draw out the shaft 26 driving the turret in the direction of the arrow 29 so that the key 27 may move out of the grooves 28 and allow the easy handling of the turret. The turret being positioned by a strap 30 pivotally secured at 31 to the saddle, it is easy to remove the turret at the moment of the positioning of the gauges after release of the clamping means constituted by a bolt 32 pivotally secured inside the member 33 fitted in the saddle, said bolt extending through an eye in the strap 30 and the clamping being ensured by a nut 32'.

The turret 9 carrying the gauges defining the travel of the transverse carriage during the cuts executed by the rear tool, is similar to the turret 8 inasmuch as the gauges are carried in sockets 43 which are held in position by radial screws 44. The transmission is performed as aforesaid by a shaft 45 driven by a chain pinion 21 and by a key 46 engaging slidingly the grooves 47 in the axial bore of the turret. As in the preceding case, the shaft 45 may be drawn out in the direction of the arrow 48 so that the key 46 may disengage the grooves 47. It is thus possible to remove the turret 9 after releasing the arcuate member 49 pivotally secured at 50 to the support 52 fitted inside the transverse carriage and carrying the turret 9, said arcuate member being held in position by the bolt 51 pivotally secured inside the said support 52. The gauges carried thus by the transverse carriage engage at the end of their travel the stop Y rigid with the saddle 4 without the relative movements of the transverse carriage with reference to the saddle hindering by any means the control of the turret 9 which is driven through the telescopic arrangement 45, 46, 47.

As to the turret 7 carrying the gauges defining the longitudinal movement of the tool, it is illustrated in Fig. 18 and it carries a number of gauges such as L through the agency of small headstocks 36 secured by the nuts 37 while the turret 7 receives as disclosed its rotary movement, through 60° from the shaft 40 driven by the shaft 14 and the chain transmission 22, 23, 24, the shaft 40 being connected with the turret through one or more studs such as 38. The dismantling of the gauge-carrying turret 7 is performed very easily after unscrewing the dead center 39 engaged axially by said turret. The different gauges include a shoulder member constituted by a ring 39'. As already mentioned, the different gauges are held in position by small headstocks 36 and nuts 37 engaging longitudinal grooves 7' in the turret 7. This arrangement is illustrated in Fig. 18a but, as illustrated in Fig. 18b which includes a view at 90° with reference to the main view, it is also possible to resort to adjustable stop screws forming the gauges and longitudinally adjustable with reference to the grooves 7' of the turret 7. Similarly, the gauges defining the transverse movements of the transverse carriage may be constituted by adjustable stop screws.

When using the turret arrangement described, the operator must first bring the transverse carriage into engagement with the stationary stop X through the agency of the gauge D which has been previously brought into its operative position. He then engages the gears providing for the longitudinal movement of the saddle and said gears are automatically released at the end of the cut executed by the front tool D as soon as the adjustable abutment screw 60 (Fig. 18), mounted on the lever 61 pivotally secured at 62 on the frame of the lathe, is submitted to the impact of the gauge L. The pivoting movement of the lever 61 produced by said impact acts on a pusher member 63 controlling the disconnection of the control means for the saddle. When the operator engages the transverse carriage to make it progress with a view to making the rear tool P work, the gauge defining the length of cut of the latter impinges, at the moment at which it is stopped by the abutment Y at the end of its travel, against the rod 64 which latter rocks the lever 65 pivotally secured at 66 to the saddle so as to shift the pusher member 67 which provides for the disconnection of the control means for the transverse carriage through suitable transmission means (Fig. 19).

What I claim is:

A composite stop to limit rectilinear movements in transverse directions comprising first and second rotary support means having axes angularly disposed, said support means each having a plurality of gauges of varying lengths therein, the gauges in each support means being adapted to be positioned in corresponding relation to the gauges in each other support means, and means to effect simultaneous rotation of said support means to bring the gauges therein successively into corresponding operative positions, said last-mentioned means comprising angularly disposed shafts having drive means therebetween and parallel shafts having sprocket and chain connection therebetween for driving the same.

References Cited in the file of this patent

UNITED STATES PATENTS

| 1,121,068 | Chard | Dec. 15, 1914 |
| 1,231,946 | Schellenbach | July 3, 1917 |
| 1,249,275 | Dodge | Dec. 4, 1917 |
| 2,006,144 | Lovely | June 25, 1935 |
| 2,148,348 | Groene | Feb. 21, 1939 |
| 2,468,325 | Eisele | Apr. 26, 1949 |
| 2,641,151 | Lee | June 9, 1953 |

FOREIGN PATENTS

| 160,683 | Great Britain | Mar. 31, 1921 |
| 438,610 | Great Britain | Nov. 20, 1935 |